United States Patent
Sparrowhawk et al.

(10) Patent No.: US 9,755,414 B2
(45) Date of Patent: Sep. 5, 2017

(54) OVERHEAD ELECTRICAL GROUNDING MESH AND MECHANICAL GRID STRUCTURE

(71) Applicant: LEVITON MANUFACTURING CO., INC., Little Neck, NY (US)

(72) Inventors: Bryan Sparrowhawk, Monroe, WA (US); Jeffrey P. Seefried, Lake Stevens, WA (US)

(73) Assignee: LEVITON MANUFACTURING CO., Melville, NY (US)

( * ) Notice: Subject to any disclaimer, the term of this patent is extended or adjusted under 35 U.S.C. 154(b) by 380 days.

(21) Appl. No.: 14/208,727

(22) Filed: Mar. 13, 2014

(65) Prior Publication Data

US 2014/0262412 A1 Sep. 18, 2014

Related U.S. Application Data

(60) Provisional application No. 61/783,518, filed on Mar. 14, 2013.

(51) Int. Cl.
*H02G 13/00* (2006.01)

(52) U.S. Cl.
CPC .................... *H02G 13/40* (2013.01)

(58) Field of Classification Search
CPC ..... E04B 9/14; E04B 9/06; E04B 9/18; E04B 9/22; E04B 9/30; E04B 1/62; E04B 1/7608; E04B 2/02; E04B 9/04; E04B 9/34; E04B 9/00; E04B 9/225; H02G 7/05; H02G 7/20; H02G 3/081; H02G 3/10; H02G 3/12; H02G 3/121; H02G 12/403; E04F 13/0801; E04F 13/21; H05K 1/0224; H05K 2201/0707; H05K 2201/10371; H05K 9/0022; H05K 9/0024; H05K 9/0052;

(Continued)

(56) References Cited

U.S. PATENT DOCUMENTS 2,744,590 A * 5/1956 Butts .................... E04B 5/14
                                                         52/645
3,181,274 A * 5/1965 Izenour ................. A47F 5/0892
                                                         16/96 R (Continued)

OTHER PUBLICATIONS

Pirela, Joel. "How to Conserve Energy, Starting at the Plug", Apartment Therapy, published online at [http://www.apartment-therapy.com/conserving-energy-starting-at-124740], dated Aug. 19, 2010, retrieved on Sep. 18, 2015, 2 pages.

*Primary Examiner* — Pete Lee
(74) *Attorney, Agent, or Firm* — Amin, Turocy & Watson, LLP (57) ABSTRACT

An overhead electrical grounding mesh and mechanical grid structure for a data center includes a plurality of orthogonally arranged grid beams. Each of the grid beams is a rigid and electrically conductive grid beam to provide an overhead structure configured to be positioned over electronic equipment in the data center. The grid structure is configured to provide support for electronic equipment connected to the grid structure and to provide support for mechanical equipment in the data center that is connected to the grid structure. The grid structure is further adapted to be electrically coupled to the electronic equipment to provide an electrically conductive ground mesh for the electronic equipment in the data center.

20 Claims, 6 Drawing Sheets

(58) Field of Classification Search
CPC .. H05K 9/0071; H05K 9/0081; H05K 9/0098; H05K 1/0218
USPC .............. 174/43, 443, 491; 52/506.6, 220.6; 361/816
See application file for complete search history.

(56) References Cited

U.S. PATENT DOCUMENTS

| | | | | |
|---|---|---|---|---|
| 3,590,135 | A | * | 6/1971 | Herbenar ............... H02G 3/281 |
| | | | | 174/491 |
| 3,807,528 | A | * | 4/1974 | Frank .................... E04F 11/064 |
| | | | | 182/81 |
| 4,492,066 | A | * | 1/1985 | LaLonde ................. E04B 9/127 |
| | | | | 52/506.06 |
| 4,540,847 | A | * | 9/1985 | Gardner ................. E04B 9/064 |
| | | | | 174/491 |
| 4,598,521 | A | * | 7/1986 | Slapsys .................. E04B 9/127 |
| | | | | 403/187 |
| 4,959,504 | A | * | 9/1990 | Yarger ................. H05K 9/0001 |
| | | | | 174/386 |
| 5,752,682 | A | | 5/1998 | Anderson |
| 6,448,495 | B1 | | 9/2002 | Mattei et al. |
| 6,879,490 | B2 | | 4/2005 | Mattei et al. |
| 7,019,213 | B1 | | 3/2006 | McNutt et al. |
| 7,352,947 | B2 | | 4/2008 | Phung et al. |
| 7,417,188 | B2 | | 8/2008 | McNutt et al. |
| 7,431,610 | B2 | | 10/2008 | Laursen |
| 7,637,771 | B2 | | 12/2009 | Laursen |
| 7,963,486 | B2 | | 6/2011 | Wilson et al. |
| 8,038,015 | B2 | | 10/2011 | Laursen et al. |
| 8,061,534 | B2 | | 11/2011 | Laursen et al. |
| 8,119,915 | B2 | | 2/2012 | Regester et al. |
| 8,314,336 | B2 | * | 11/2012 | Liang .................... E04B 9/0428 |
| | | | | 174/40 R |
| 8,464,984 | B2 | | 6/2013 | Laursen |
| 2002/0094184 | A1 | | 7/2002 | Mattei et al. |
| 2003/0051892 | A1 | | 3/2003 | Mattei et al. |
| 2009/0129016 | A1 | * | 5/2009 | Hoeft ................. H05K 7/20745 |
| | | | | 361/694 |
| 2010/0198535 | A1 | | 8/2010 | Brown et al. |
| 2010/0229475 | A1 | * | 9/2010 | Myers .................... E04B 9/006 |
| | | | | 52/173.1 |
| 2011/0167282 | A1 | | 7/2011 | Brown et al. |

* cited by examiner

OVERHEAD ELECTRICAL GROUNDING MESH AND MECHANICAL GRID STRUCTURE

PRIORITY DATA

The present application claims the benefit of U.S. Provisional Patent Application No. 61/783,518, filed Mar. 14, 2013, which application is incorporated herein by reference in its entirety.

TECHNICAL FIELD

The present disclosure relates generally to data centers, and more specifically to an overhead structure in a data center that provides both electrical grounding functionality and mechanical structure for electrical and mechanical components in the data center.

BACKGROUND

Data centers are buildings or portions of buildings that house electronic equipment, such as telecommunications equipment, networking equipment, computer systems like servers, and so on, along with mechanical equipment like air conditioning units and signal and power cable routing structures required for operation of the electronic equipment. Current data centers generally have a raised floor and under-floor plenum, and may have a separate plenum between the structural ceiling and a drop-down ceiling, for air circulation for heating, ventilation and air conditioning. Such plenum spaces may also be used to house signal and/or power cables and the ancillary hardware required to organize, support and manage such cabling.

In a raised floor structure, the data center includes a slab floor over which is positioned an elevated, or raised, floor on which equipment, including equipment racks and air conditioning units, may be placed. The space underneath the raised floor may be used, in addition to routing signal and power cables, to house an electrical ground grid or mesh for the data center equipment, and to provide passage for the air flow required to maintain the equipment at desired operating temperatures.

Data center design has shifted, however, away from the extensive use of the raised floor plenum for housing cabling. Instead, it is preferred to keep the raised floor plenum relatively uncluttered to ensure the unrestricted flow of air to cool data center equipment. As a result of this design shift, cabling and its associated support hardware is increasingly being displaced to overhead areas on top of, and above, the upper surfaces of equipment racks and cabinets located in the data center, and upwardly toward the ceiling region of the data center.

As a result, cables are increasingly being positioned within the data center in locations remote from the electrical ground mesh which typically remains in the raised floor plenum. This increasing physical separation of the upwardly positioned cabling and the electrical ground mesh within the raised floor plenum causes an undesirable increase in the electromagnetic susceptibility and emissions of the data center. This occurs because the physical separation of the cabling and the electrical ground mesh creates a large pick-up area of an inductive loop within the data center, as will be appreciated by those of ordinary skill in the art. It may also create an increased risk of data center equipment damage due to a nearby lightning strike or high power electrical ground fault. There is thus a need for improved data center structures that mitigate the electrical and mechanical challenges created by such data center design changes to provide reliable operation of the data center.

SUMMARY

According to one embodiment of the present disclosure, an overhead electrical grounding mesh and mechanical grid structure for a data center includes a plurality of orthogonally arranged grid beams. Each of the grid beams is a rigid and electrically conductive grid beam to provide an overhead structure configured to be positioned over electronic equipment in the data center. The grid structure is also configured to provide support for electronic equipment connected to the grid structure and to provide support for mechanical equipment in the data center that is connected to the grid structure. The grid structure is further adapted to be electrically coupled to the electronic equipment to provide an electrically conductive ground mesh for the electronic equipment in the data center. In some embodiments, the overhead electrical grounding mesh may be incorporated into a ceiling structure of the data center thereby defining an air plenum space in a manner similar to a traditional drop ceiling.

DETAILED DESCRIPTION

Figure 1:
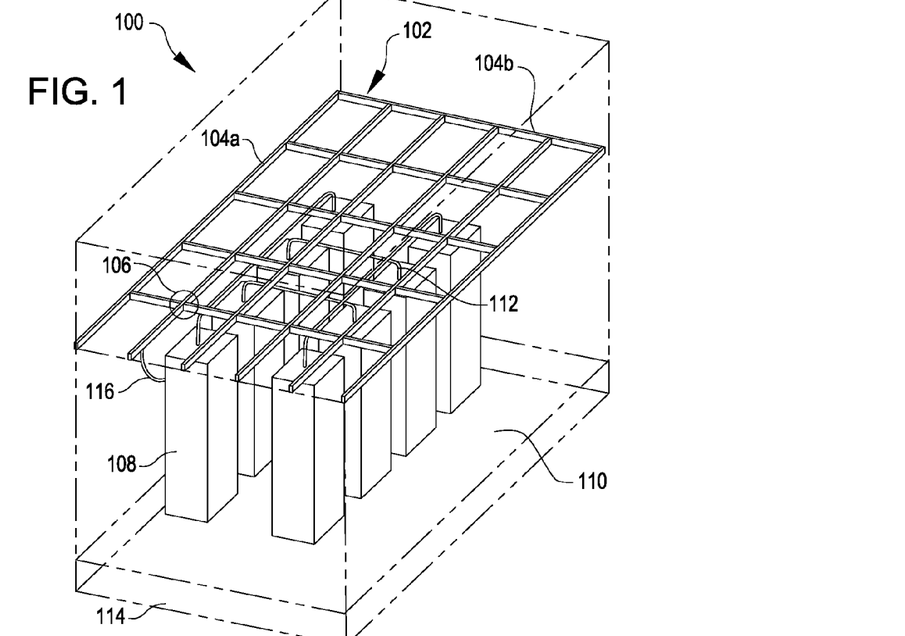
FIG. 1 is a perspective view of a data center including an overhead electrical grounding mesh and mechanical grid structure.

FIG. 1 is a perspective view of a data center 100 including an overhead electrical grounding mesh and mechanical grid structure 102 according to one embodiment. The grid structure 102 includes a number of orthogonally arranged grid beams 104a and 104b that interconnect at cross-beam portions 106 and are formed from a material, and of a size suitable, to provide both required electrical grounding and structural support for the mounting of electronic and mechanical equipment (not shown) in the data center, as will be described in more detail below. In this way the grid structure 102 functions as both the electrical ground mesh for the data center 100 while also being a mechanical structure to which signal cables and mechanical equipment, such as air conditioning units, can be mounted. The disclosed grid structure 102 may even be of sufficient strength to support ladders, catwalks and the like to permit humans to climb, crawl and/or walk upon for enhanced access to the electronic and mechanical equipment mounted thereon.

In the following description, certain details are set forth in conjunction with the described embodiments to provide a sufficient understanding of the subject disclosure. One of ordinary skill in the art will appreciate, however, that the embodiments of this disclosure may be practiced without these particular details. Furthermore, one of ordinary skill in the art will appreciate that the example embodiments described below do not limit the scope of the present disclosure, and will also understand that various modifications, equivalents, and combinations of the disclosed embodiments, and components thereof, are within the scope of the present disclosure. Embodiments including fewer than all the components of any of the respective described embodiments may also be within the scope of the present disclosure although not expressly described in detail below. Finally, the operation of well-known components, structures, and/or processes has not been shown or described in detail below to avoid unnecessarily obscuring the present disclosure.

As seen in FIG. 1, the data center 100 includes a number of equipment racks 108 that house electronic equipment (not shown), such as computer servers. The racks 108 rest on a raised floor 110 and the electronic equipment in the racks is connected to signal and power cables 112. The grid structure 102 is a rigid structure and supports the cables 112 to facilitate the routing of the cables as required. A space or raised-floor plenum 114 under the raised floor 110 (and/or a plenum in a drop down ceiling (not shown)) functions to channel the flow of air for cooling the equipment racks, as will be described in more detail below with reference to FIG. 2. The rigid grid structure 102 is formed from a suitable size and material, such as copper-coated aluminum, to provide the required rigid support structure and electrical ground mesh for the equipment in the racks 108. For one of the equipment racks 108, a ground cable 116 is shown connected to the grid structure to provide the required ground connection for the corresponding rack, and such a cable or cables would typically be present for each equipment rack although not expressly shown in FIG. 1.

Before describing the grid structure 102 in more detail, some of the additional physical features of the data center 100 will be discussed with reference to FIGS. 2 and 3 and contrasted to conventional data centers with reference to FIGS. 4 and 5 in order to better understand additional aspects of the grid structure subsequently described with reference to FIGS. 6-14. Common components between FIG. 1 and FIGS. 2-5 have been given the same reference numbers as assigned to these components in FIG. 1.

Figure 2:
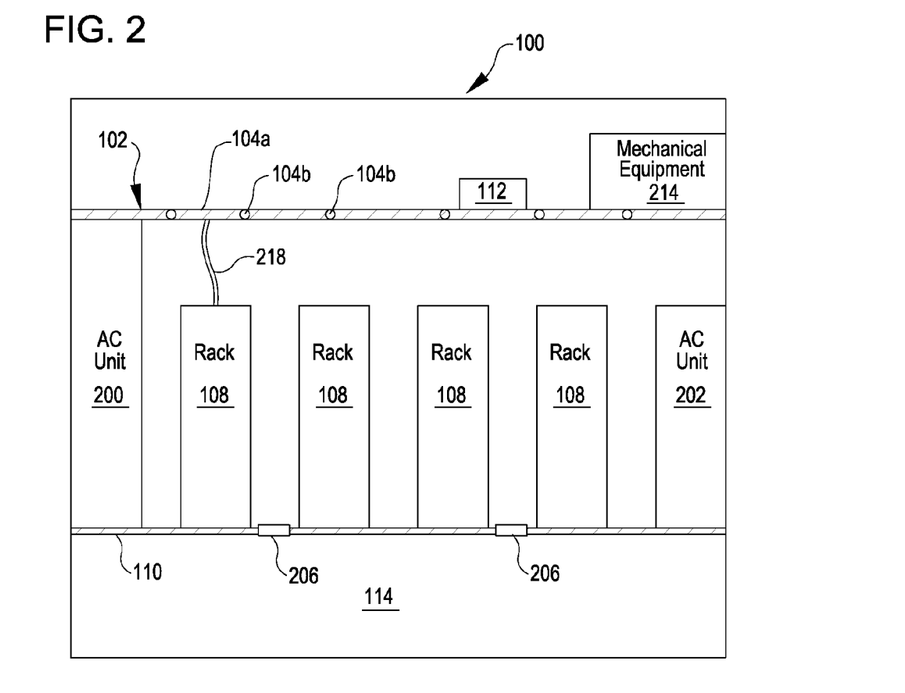
FIG. 2 is a cross-sectional view of the data center of FIG. 1.

FIG. 2 is a cross-sectional view of the data center 100 showing the equipment racks 108 as well as air conditioning (AC) units 200, 202 (not shown in FIG. 1) resting on the raised floor 110 that function to maintain the data center, and thereby the electronics in the equipment racks, at a desired operating temperature. The AC units 200, 202 provide cool airflow in the raised-floor plenum 114 under the raised floor 110 and this cool air has sufficient pressure to enter the area above the raised floor through vented tiles 206 in the raised floor. The grid structure 102 above the equipment racks 108 is shown with the AC unit 200 attached at its top end to the grid structure 102. The same could be true for AC unit 202 as well as some or all of the equipment racks 108.

As previously described and depicted in FIG. 2, the grid structure 102 is sufficiently rigid such that it can provide structural support for components in the data center 100. In addition to the AC unit 200 and other mechanical equipment being attached to the grid structure 102 from below, mechanical equipment, structural devices, and electronic components may also be attached to the grid structure from above. For example, mechanical equipment 214 is shown attached to the grid structure 102 from above and is thus contained in an area 216 above the grid structure. This mechanical equipment 214 may be any of a variety of different types of equipment, such as additional AC units, structural devices like a catwalk attached to the grid structure to allow maintenance personnel to walk or crawl on the catwalk and service equipment located above the grid structure 102, and so on. Electronic components such as signal and power cables may also be physically attached to the grid structure 102, either from above or below the grid structure. A box labeled 112 on the grid structure 102 represents signal and power cables 112 that are physically attached to and supported by the grid structure. The grid structure 102 in this way functions as structural support to allow for the routing of cables between the equipment racks 108 and otherwise as necessary within the data center 100.

As previously described and further depicted in FIG. 2, the grid structure 102 is constructed from a suitable electrically conductive material so as to function as the grounding mesh for the data center 100. Accordingly, each of the equipment racks 108 would be electrically connected to the grid structure 102 through a corresponding grounding cable, with such a grounding cable 218 being illustrated only for the equipment rack on the far left of FIG. 2. In this way, the grid structure 102 provides both structural support and the electrical grounding mesh for the data center.

Positioning the grid structure 102 above the equipment and racks 108 in a data center positions the grounding mesh proximate the signal cables and is advantageous for reducing unwanted electromagnetic interference within the data center. For example, as previously mentioned, signal cables and power cables are increasingly being positioned above the equipment racks 108 instead of in the space 114 below the raised floor 110 to ensure there is adequate space for required airflow in the space 114. Leaving the ground mesh under the raised floor 110 while positioning the signal cables above the equipment racks 108 undesirably increases the electromagnetic susceptibility of the electronic equipment contained in the equipment racks due to the enlarged pick-up area of an inductive loop created by the increased distance between such signal cables and the under-the-floor ground mesh. The grid structure 102 reduces such electromagnetic susceptibility through its positioning proximate the signal cables coupled to the grid structure.

Figure 3:
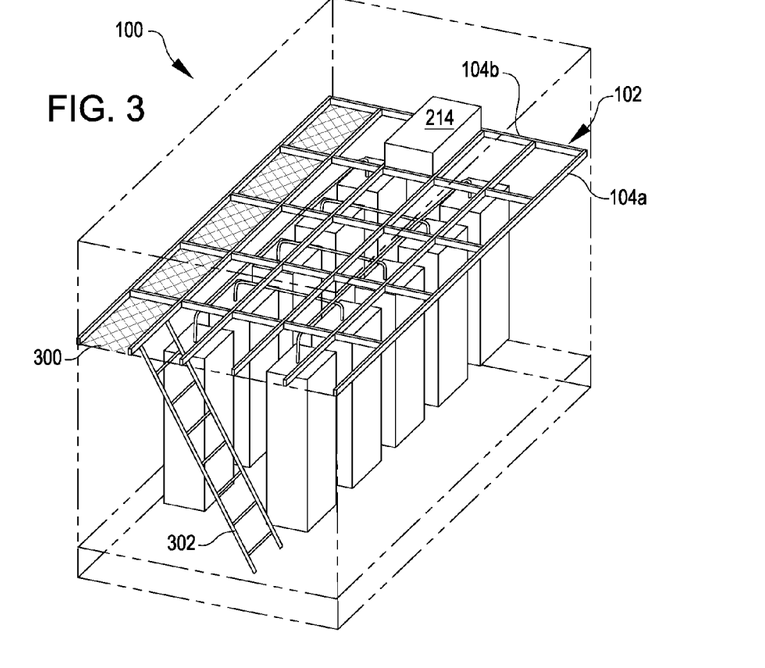
FIG. 3 is a perspective view of the data center of FIGS. 1 and 2 showing several examples of equipment that may be attached to and supported by the overhead electrical grounding mesh and mechanical grid structure.

FIG. 3 is a perspective view of the data center 100 of FIGS. 1 and 2 showing several examples of equipment that may be attached to and supported by the overhead electrical grounding mesh and mechanical grid structure 102. In the example of FIG. 3, the grid structure 102 includes a catwalk 300 constructed on the grid beams 104a and 104b as shown. A ladder 302 is shown supported by the grid structure 102 and may be utilized by maintenance personnel (not shown) to climb up onto the catwalk 300 to gain access to mechanical and electrical equipment from above the grid structure. For example, a person could climb up the ladder 302 onto the catwalk 300 and then walk down the catwalk to gain access to the mechanical equipment 214 previously discussed with reference to FIG. 2, or to route or repair signal and power cables 112, or any other mechanical or electronic equipment that may only be accessed or may be more easily accessed from above the grid structure 102.

Figure 4:
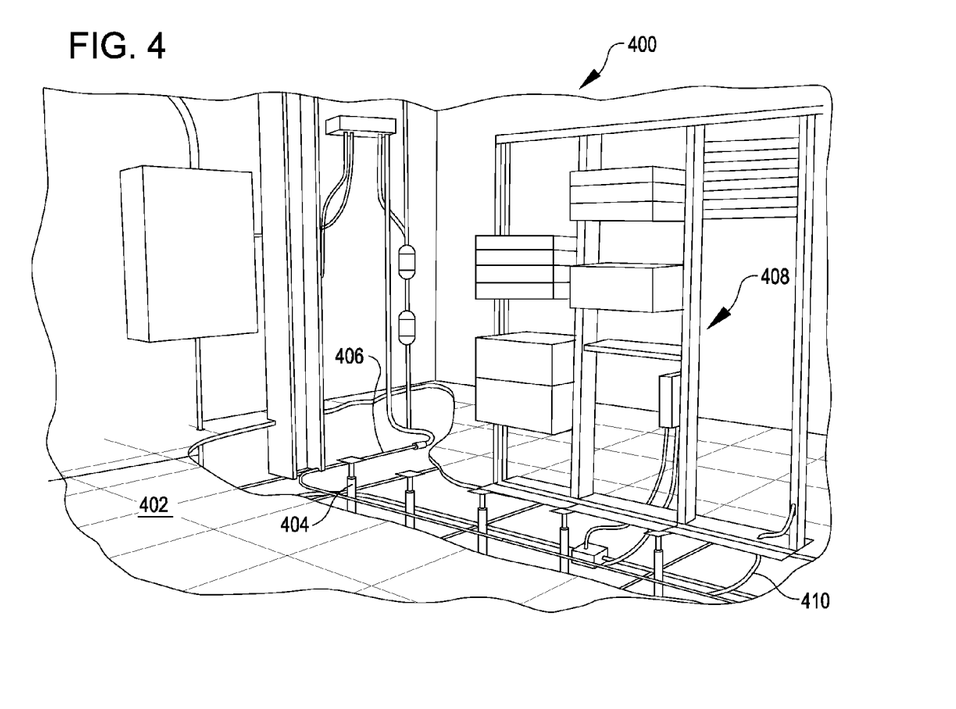
FIG. 4 is a perspective view of a data center such as the data center of FIGS. 1 and 2 showing a cutaway view of the raised floor.
Figure 5:
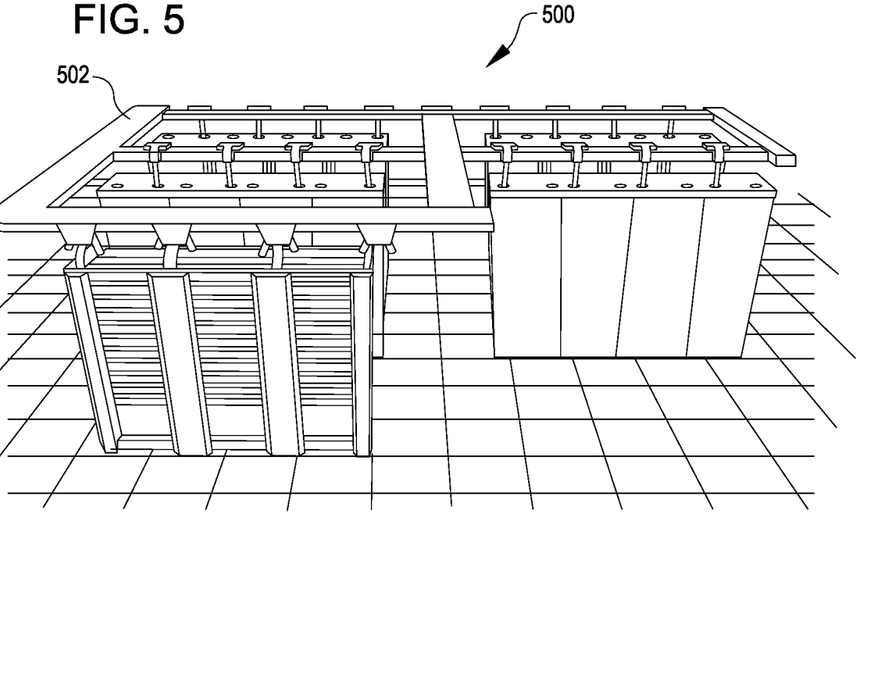
FIG. 5 is a perspective view of a data center including an overhead cable rack for routing signal cables.

FIGS. 4 and 5 are perspective views of conventional data centers 400 and 500 that will now be described to better illustrate the different mechanical and electrical characteristics of the data center 100 of FIGS. 1-3. FIG. 4 shows a cutaway view of a conventional raised floor 402 including vertical floor supports 404 that support the raised floor. As seen in the cutaway, a grounding mesh 406 is also routed under the raised floor 402 with equipment racks being electrically grounded to the mesh 406, as illustrated via cables 410. Although not shown in FIG. 4, in the data center 400 the signal and power cables are routed overhead the equipment racks 408. FIG. 5 illustrates a data center 500 that includes a conventional overhead cable pathway structure 502 that could be utilized in routing the required cables overhead in the data center 400 of FIG. 4. Note that with this approach, the signal and power cables are routed overhead in the equipment racks 408 while the grounding mesh 406 is positioned under the equipment racks in the area under the raised floor 402. As previously mentioned with regard to the embodiments of FIGS. 1-3, such a separation between the signal and power cables and the grounding mesh undesirably increases the electromagnetic interference susceptibility of the data center. Furthermore, note that the overhead cable path structure 502 of FIG. 5 is simply a structure attached to the equipment racks to facilitate the overhead routing of cables and does not function as the grounding mesh or provide structural support for mechanical equipment.

Figure 6:
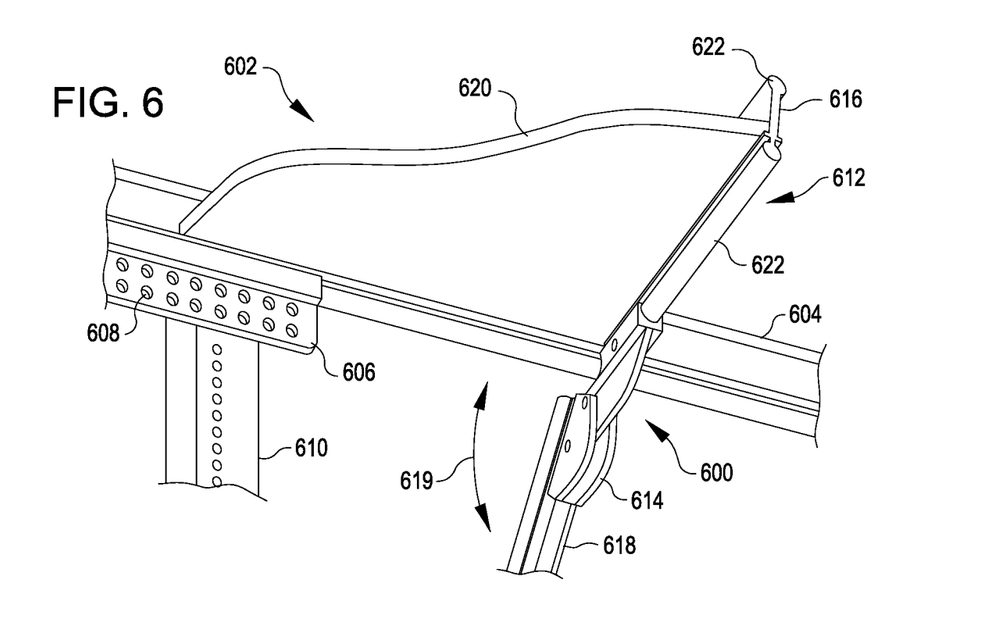
FIG. 6 is a perspective view of one of the cross-beam portions in the structure of FIG. 1.

FIG. 6 is a perspective view of one cross-beam portion 600 in a grid structure 602 corresponding to one embodiment the grid structure 102 of FIG. 1. The cross-beam portion 600 is accordingly one embodiment of the cross-beam portions 106 previously described with reference to FIG. 1. The grid structure 602 includes longitudinal grid-beams 604 that extend over a length of the data center 100 and are attached at their ends to the walls of the data center (not shown in FIGS. 1 and 6). As previously described, these longitudinal grid-beams 604 are formed from a suitable material and size so as to be both electrically conductive to provide the grounding mesh function of the grid structure 602 as well as being sufficiently rigid to provide structural support for mechanical components located in the data center 100.

In the embodiment of FIG. 6, the longitudinal grid-beam 604 is formed such that mounting plates 606 can be attached to the grid-beam to allow mechanical equipment to thereby be attached to and supported by the grid-beam. As seen in FIG. 6, the mounting plate 606 includes a plurality of holes 608 to allow for bolts or other suitable attachment means to be inserted through the holes to secure desired mechanical equipment (not shown) to the mounting plate. For example, in FIG. 6 a vertical rack member 610 of one of the equipment racks 108 (FIG. 1) is shown and would be attached to the mounting plate 606 through suitable bolts or other attachment means inserted through the holes 608, although no such bolts or attachment means are expressly illustrated in FIG. 6. In this way, one or more of the equipment racks 108 can be attached to the grid structure 602 to provide improved seismic characteristics of the data center 100, for example.

The grid structure 602 further includes collapsible transverse grid-beams 612 that are attached to the longitudinal grid-beam 604 at corresponding cross-beam portions 600 through an attachment and hinge structure 614. The collapsible transverse grid-beam 612 includes a first transverse grid-beam section 616 having one end attached to the hinge structure 614 and a second transverse grid-beam section 618 having one end attached to the hinge structure as shown in FIG. 6. Hinge structure 614 is also formed from a suitably rigid and electrically conductive material. The hinge structure 614 is configured so that the contact between the hinge structure and the longitudinal grid-beam 604 is sufficient to ensure proper electrical connection of the longitudinal grid-beam to the transverse grid-beam sections 616, 618. All longitudinal grid-beams 604 and transverse grid-beam sections 616, 618 must be electrically coupled via the hinge structures 614 for the grid structure 602 to provide the grounding mesh functionality for all electronic equipment connected to the grid structure (i.e., connected to the grid-beams or grid-beam sections.) Thus, the hinge structures 614 contact the longitudinal grid-beams 604 with sufficient pressure to provide this required electrical interconnection.

In operation, one or both of the grid-beam sections 616, 618 can be folded downward from a horizontal position, which is the position of the transverse grid-beam section 616 in FIG. 6, to allow access to equipment (not shown in FIG. 6) contained above the grid structure 602. The arrow 619 in FIG. 6 shows that in the embodiment of FIG. 6, the transverse grid-beam section 618 may be moved from the horizontal or raised position (e.g., same position as that of transverse grid-beam section 616) to a lowered position as shown in FIG. 6.

Grid structure 602 is further configured to support ceiling tiles 620, much as does a conventional suspended or "drop ceiling" prevalent in commercial office buildings. This enables equipment above the grid structure 602 to be hidden from view when the tiles 620 are in place, and can also provide an area above the grid structure 602 for additional airflow control as does a conventional drop ceiling.

In the embodiment depicted in FIG. 6, the transverse grid-beam sections 616 and 618 each include a rounded portion or bead 622 on an upper and lower portion of the sections. The bead 622 is how the hinge structure 614 is attached to the transverse grid-beam sections 616 and 618, as seen most clearly for the transverse grid-beam section 616 in the FIG. 6. The hinge structure 614 includes pieces adapted to go around the bead 622 and suitable attachment means, such as screws, through which the hinge structure is secured around the bead 622 and thereby attached to the transverse grid-beam sections 616 and 618.

Figure 7:
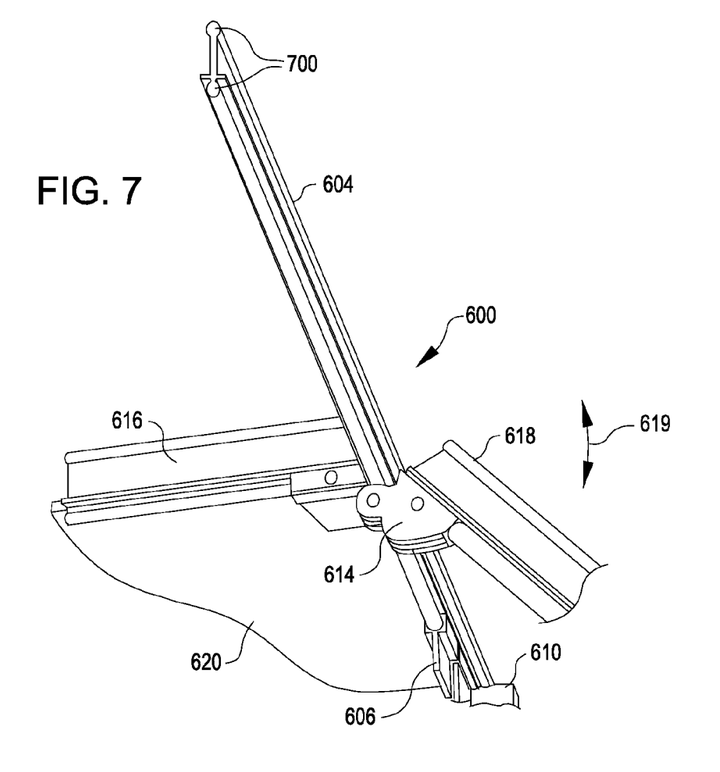
FIG. 7 is another perspective view of one of the cross-beam portions of FIG. 1 illustrating foldable grid beams to allow for access into the space above the structure.

FIG. 7 is another perspective view of the grid-beam portion 600 of FIG. 6 further illustrating the foldable functionality of the transverse grid-beam section 618. In addition, FIG. 7 illustrates a bit more detail about the specific structure of the longitudinal grid-beam 604 and the attachment of the mounting plate 606 to the longitudinal grid-beam 604. The longitudinal grid-beam 604 also includes a bead 700 at the upper and lower portions of grid-beam 604 to allow components to be attached, such as the mounting plate 606 as seen in FIG. 7. The mounting plate 606 is secured around the lower bead 700 of the longitudinal grid-beam 604 in the same way as described for the hinge structure 614 being attached to the sections 616 and 618 with reference to FIG. 6.

Figure 8:
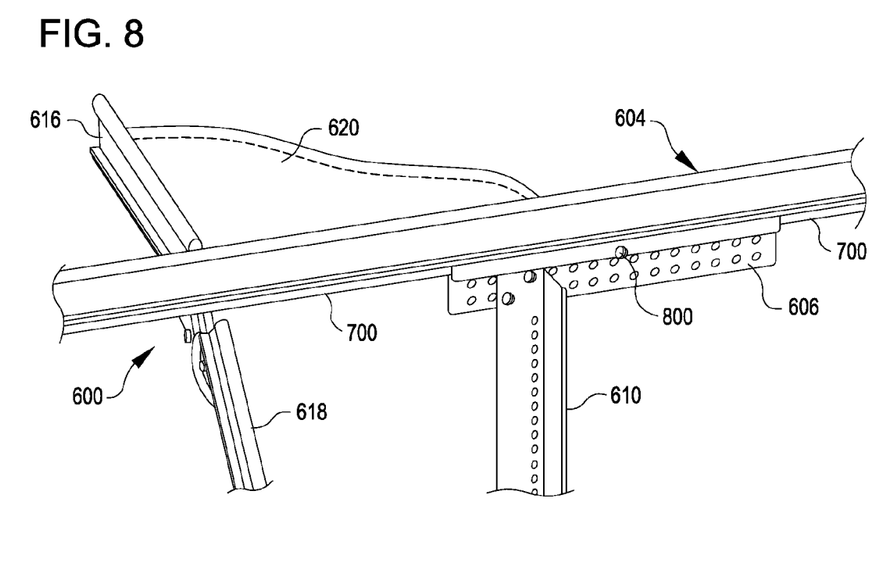
FIG. 8 is another perspective view of one of the cross-beam portions of FIG. 1 showing the foldable grid beams of FIG. 7.

FIG. 8 is another perspective view of the cross-beam portion 600 of FIG. 6 showing in more detail the attachment of the vertical rack member 610 to the mounting plate 606. As seen in the FIG. 8, a screw 800 secures the mounting plate 606 around the lower bead 700 of the longitudinal cross-beam 604 in this embodiment.

Figure 9:
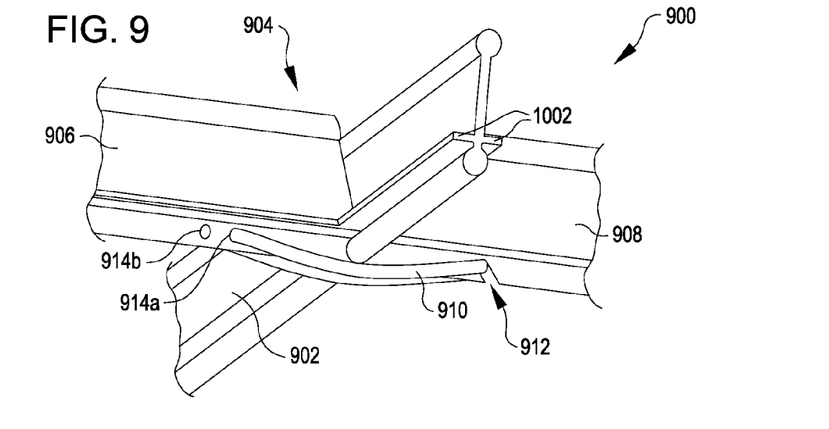
FIG. 9 is a perspective view of one of the cross-beam portions of FIG. 1.

FIG. 9 is a perspective view of a cross-beam portion 900 corresponding to another embodiment of one of the cross-beam portions 106 of FIG. 1. In the embodiment of FIG. 9, the cross-beam portion 900 is formed at the intersection of a longitudinal grid-beam 902 and a transverse grid-beam 904 including transverse grid-beam sections 906 and 908. The transverse cross-beam sections 906 and 908 are held in place on the respective sides of the longitudinal grid-beam 902 through a spring 910 made of a suitable steel or other suitable elastic material. The spring 910 is secured at one end in a groove 912 formed in the lower end of the transverse grid-beam section 908. The spring 910 is secured at the other end via suitable holes 914a and 914b formed in the lower portion of the transverse grid-beam section 906 (see also FIGS. 10, 11 and 12). The hole 914a is formed in the lower front portion of the transverse grid-beam section 906 seen in FIG. 9 while the hole 914b is formed in the lower back portion of transverse grid-beam section 906, or the holes 914a, 914b can extend entirely through the lower portion of the transverse grid-beam section 906 from the front to the back, as will be described in more detail below with reference to FIG. 11.

Figure 10:
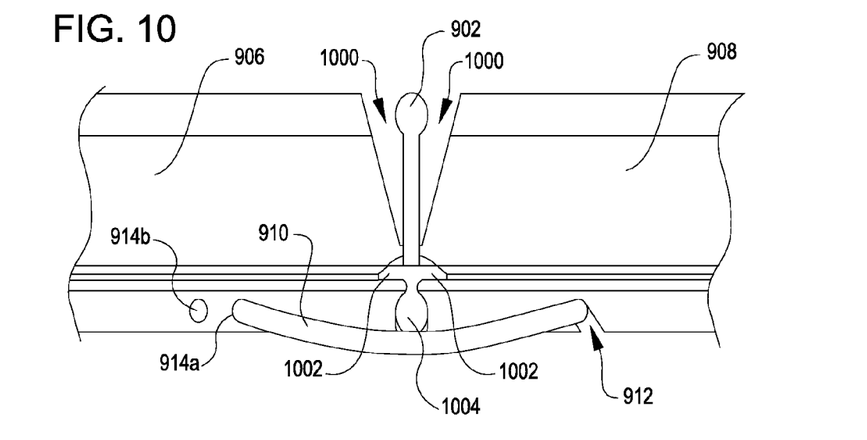
FIG. 10 is a cross-sectional view of the cross-beam portion of FIG. 9.

FIG. 10 is a cross-sectional view of the cross-beam portion 900 of FIG. 9 showing the cross-sectional shape of the longitudinal grid-beam 902 along with the shape of end portions 1000 of the transverse grid-beam sections 906 and 908 in this embodiment. The longitudinal grid-beam 902 includes horizontal projections 1002 (see also FIG. 9) extending from sides of grid-beam 902 near a lower bead 1004 of the grid-beam. The horizontal projections 1002 are configured to engage the end portions 1000 of the transverse grid-beam sections 906 and 908 as illustrated. FIG. 10 illustrates the cross-beam portion 900 secured in place within the grid structure 102 (FIG. 1).

Figure 11:
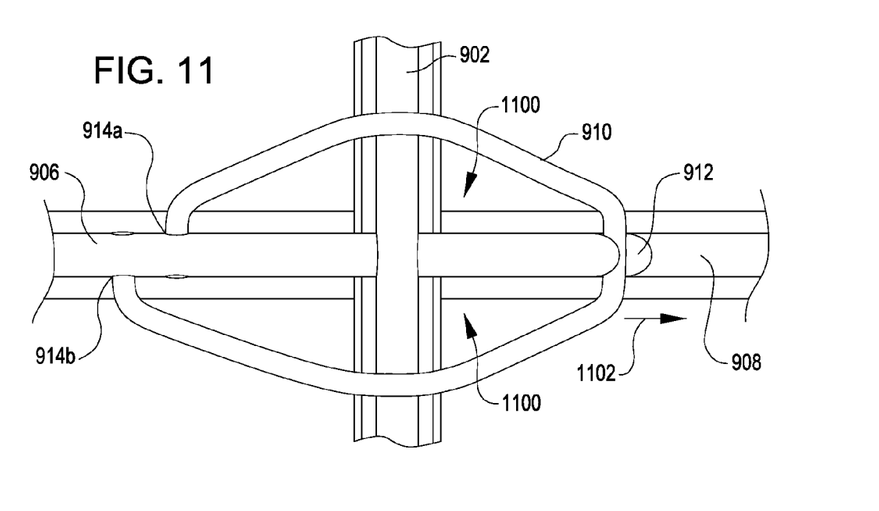
FIG. 11 is a bottom view of the cross-beam portion of FIG. 9.
Figure 12:
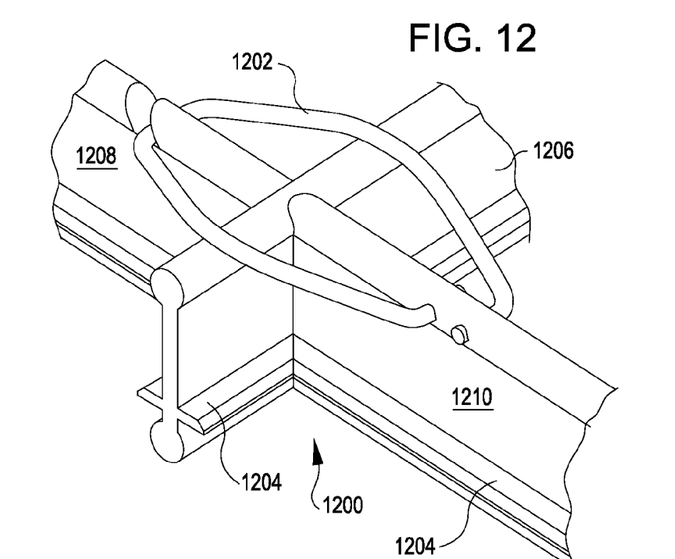
FIG. 12 is a perspective view illustrating a cross-beam portion similar to that of FIG. 9 except with a compression bale on top of the cross-beam portion.

FIG. 11 is a bottom view of the cross-beam portion 900 of FIGS. 9 and 10. To gain access to the area above the grid structure 102 (e.g., to temporarily remove the cross-beam portion 900) a person would squeeze the spring 910 inward in the direction indicated by arrows 1100 in FIG. 11. Since the ends of the spring 910 are secured in the holes 914a and 914b, the right end of the spring 910 in the groove 912 will shift rightward in the groove as indicated by the arrow 1102 until the spring can be removed from the groove at this right end and folded downward. At this point, the transverse grid-beam sections 906 and 908 can be removed by moving the sections in the direction indicated by either arrow 1100 until the section can be removed from engagement with the horizontal projections 1002 of the longitudinal cross-beam 902 (see FIG. 10). FIG. 12 is a perspective view illustrating a cross-beam portion 1200 similar to the cross-beam portion 900 of FIG. 9 except in this embodiment a spring 1202 is positioned on top of the cross-beam portion instead of on the bottom of the cross-beam portion as in FIG. 9. In this way, the spring 1202 may be hidden from view when the cross-beam portion 1200 of the grid structure 102 (FIG. 1) containing the cross-beam portion is secured in place. Note that in this embodiment the ceiling tiles 620 (FIG. 6) or other fixtures, including but not limited to lighting fixtures, would need to be flexible so that each tile can be flexed and inserted under the spring 1202 to rest on a ledges 1204 contained on longitudinal cross-beam 1206 and transverse cross-beam sections 1208 and 1210.

Figure 13:
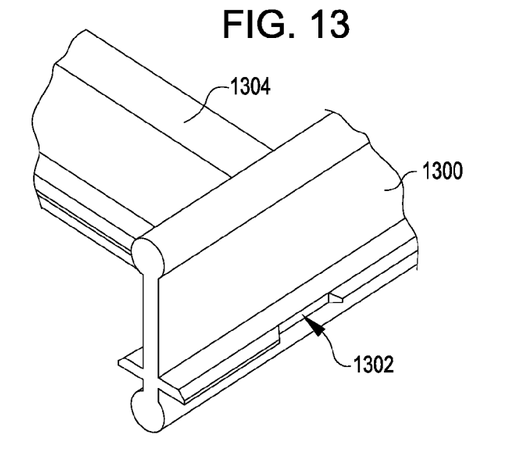
FIG. 13 is a perspective view of one of the cross-beam portions of FIG. 1 where one of the cross beams includes an indexing cutout to provide easy equidistant spacing of cross beams during assembly of the grid structure.

FIG. 13 is a perspective view of another embodiment of the cross-beam portion 106 FIG. 1 in which a longitudinal cross-beam 1300 includes an indexing feature 1302 in the form of a cutout in this embodiment. The indexing feature 1302 allows transverse cross-beam sections 1304 to be positioned at precise locations along a length of the longitudinal cross-beam 1300. Thus, an end of a transverse cross-beam section 1304 would fit into the indexing feature 1302 to thereby position the section at this precise location along the length of the longitudinal cross-beam 1300.

Figure 14:
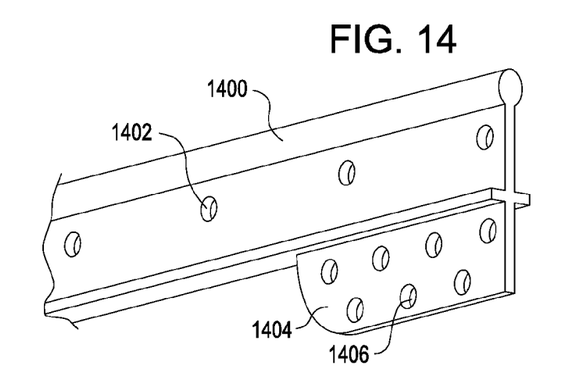
FIG. 14 is a perspective view of one embodiment of one of the grid beams of FIG. 1.

FIG. 14 is a perspective view of a portion of a grid beam 1400 corresponding to one embodiment of one of the grid beams 104a or 104b of FIG. 1 as well as the grid beams discussed with reference to FIGS. 6, 9, 12, 13. In this embodiment, the grid beam 1400 includes holes extending along a length of the grid beams to allow for easy mounting of equipment to the grid beam. In addition, the grid beam 1400 includes an integral mounting plate 1404 including a plurality of holes 1406 once again for attaching equipment to the mounting plate and thereby securing the equipment to the grid structure including the grid beam 1400.

Even though various embodiments and advantages of the present disclosure have been set forth in the foregoing description, the present disclosure is illustrative only, and changes may be made in detail and yet remain within the broad principles of the present disclosure. Many of the specific details of certain embodiments are set forth in the description and accompanying figures to provide a thorough understanding of such embodiments. One skilled in the art will understand, however, that the subject matter of the present disclosure may be practiced without several of the details described. Moreover, one skilled in the art will understand that the figures related to the various embodiments are not to be interpreted as necessarily conveying any specific or relative physical dimensions. Specific or relative physical dimensions, if stated, should not to be considered limiting unless the claims expressly state otherwise. Further, illustrations of the various embodiments when presented by way of illustrative examples are intended only to further illustrate certain details of the various embodiments, and should not be interpreted as limiting the scope of the appended claims.

What is claimed is:
1. A system, comprising:
a conductive mesh and mechanical grid structure comprising a plurality of orthogonally arranged grid beams, wherein a first grid beam and a second grid beam of the plurality of orthogonally arranged grid beams are rigid and electrically conductive grid beams disposed above a plurality of electronic equipment in a data center, wherein the second grid beam is arranged orthogonal to the first grid beam via a hinged portion of the second grid beam adapted to enable a collapsible connection of the second grid beam to the first grid beam, wherein the hinged portion comprises an open-loop spring to facilitate the collapsible connection, wherein the hinged portion enables electrical connectivity between the first grid beam and the second grid beam, and wherein the conductive mesh and mechanical grid structure are configured to provide:
support for an electronic equipment of the plurality of electronic equipment in the data center, and support for a mechanical equipment of a plurality of mechanical equipment in the data center;

and wherein the conductive mesh and mechanical grid structure is adapted to provide shielding from electrical interference to another electronic equipment of the plurality of electronic equipment in the data center.

2. The system of claim 1, wherein the conductive mesh and mechanical grid structure comprises a ladder.

3. The system of claim 1, wherein the conductive mesh and mechanical grid structure comprises a catwalk.

4. The system of claim 1, wherein an intersection between the first grid beam and the second grid beam forms a cross-beam portion, and wherein the cross-beam portion is operable to allow the second grid beam to be repositioned to provide access to a space above the mesh and mechanical grid structure.

5. The system of claim 4, wherein the hinge portion is operable to raise and lower a portion of the second grid beam to provide access to the space above the mesh and mechanical grid structure.

6. The system of claim 1, wherein the open-loop spring is operable, when secured in position, to hold the second grid beam in place and is removable to enable the second grid beam to be removed to provide access to the space above the mesh and mechanical grid structure.

7. The system of claim 1, wherein the open-loop spring is positioned proximate to and on a bottom of the hinged portion of the second grid beam.

8. The system of claim 1, wherein the mesh and mechanical grid structure is further configured to support ceiling tiles.

9. A method, comprising:
positioning a conductive grounding mesh and a mechanical grid structure above an equipment rack in a data center, wherein the mechanical grid structure provides support for electronic equipment and mechanical equipment in the data center, wherein the conductive ground mesh provides electromagnetic shielding for the electronic equipment in the data center, wherein the mechanical grid structure comprises a first grid beam collapsibly connected to a second grid beam via a hinged portion of the second grid beam, wherein the hinged portion comprises an open-loop spring biasing actuation of the hinged portion, and wherein the hinged portion enables electrical connectivity between the first grid beam and the second grid beam; and attaching a signal cable or a power cable to the mechanical grid structure to route the signal cable or the power cable above the electronic and mechanical equipment in the data center to reduce an electromagnetic susceptibility of the electronic equipment and emissions of the electronic equipment.

10. The method of claim 9, further comprising attaching the electronic equipment or the mechanical equipment to an upper side of the mechanical grid structure.

11. The method of claim 10, further comprising repositioning a portion of the mechanical grid structure to facilitate physical access to the electronic equipment or the mechanical equipment attached to the upper side of the grid structure.

12. The method of claim 9, wherein the positioning the conductive ground mesh and the mechanical grid structure comprises positioning a ladder enabling access to an upper side of the mechanical grid structure.

13. The method of claim 9, wherein the positioning the conductive ground mesh and the mechanical grid structure comprises positioning a catwalk structure on an upper side of the mechanical grid structure.

14. The method of claim 9, wherein the positioning the conductive ground mesh and the mechanical grid structure comprises positioning a cross-beam structure between grid beams.

15. The method of claim 14, wherein the positioning the cross-beam structure between the grid beams comprises actuating the hinged portion comprising the open-loop spring.

16. An apparatus, comprising:
a first grid beam and a second grid beam arranged substantially parallel and that are electrically conductive;
a cross-beam that is electrically conductive and disposed substantially orthogonal to, and between, the first grid beam and the second grid beam, wherein the cross-beam comprises a hinged portion that enables a collapsible electrical connection to the first grid bream by overcoming a spring force resulting from a disposition of an open-loop spring structure of the hinged portion; and
an electrically conductive mesh adapted to provide electromagnetic shielding to a device of a data center, wherein:
the cross-beam, first grid beam, and second grid beam are oriented above devices, including the device, of the data center,
the cross-beam is repositionable to another position substantially orthogonal to, and between, the first grid beam and the second grid beam, and
the cross-beam is electrically connected to the first grid beam and the second grid beam.

17. The apparatus of claim 16, wherein at least one of the first grid beam, the second grid beam, the cross-beam, and the electrically conductive mesh comprise a copper-coated aluminum material.

18. The apparatus of claim 16, further comprising a ladder structure or a catwalk structure attached to the first grid beam, the second grid beam, or the cross-beam.

19. The apparatus of claim 16, wherein the cross-beam is repositionable by releasing the open-loop spring structure to release the cross-beam from a first position and subsequently engaging the open-loop spring structure to reconnect the cross-beam at a second position.

20. The apparatus of claim 19, wherein the open-loop spring structure comprises an open-loop torsion spring.

* * * * *